(12) United States Patent
Hattori et al.

(10) Patent No.: US 11,606,511 B2
(45) Date of Patent: Mar. 14, 2023

(54) VIDEO PROCESSING DEVICE AND VIDEO PROCESSING METHOD

(71) Applicant: Roland Corporation, Shizuoka (JP)

(72) Inventors: Kohei Hattori, Shizuoka (JP); Ryusei Muroi, Shizuoka (JP)

(73) Assignee: Roland Corporation, Shizuoka (JP)

( * ) Notice: Subject to any disclaimer, the term of this patent is extended or adjusted under 35 U.S.C. 154(b) by 51 days.

(21) Appl. No.: 17/482,464

(22) Filed: Sep. 23, 2021

(65) Prior Publication Data

US 2022/0385834 A1    Dec. 1, 2022

(30) Foreign Application Priority Data

May 25, 2021    (JP) .............................. JP2021-087622

(51) Int. Cl.
     *H04N 5/268*      (2006.01)
     *H04N 5/77*      (2006.01)
     *H04N 5/262*      (2006.01)

(52) U.S. Cl.
     CPC ........... *H04N 5/268* (2013.01); *H04N 5/2624* (2013.01); *H04N 5/77* (2013.01)

(58) Field of Classification Search
     CPC ......... H04N 5/268; H04N 5/2624; H04N 5/77
     See application file for complete search history.

(56) References Cited

U.S. PATENT DOCUMENTS

| | | | |
|---|---|---|---|
| 7,319,493 B2 | 1/2008 | Hata et al. | |
| 8,675,065 B2 * | 3/2014 | Itoh | ........................ G06T 7/194 |
| | | | 709/236 |
| 2011/0080950 A1 * | 4/2011 | Toyota | ............... H04N 21/2402 |
| | | | 375/295 |
| 2016/0028997 A1 * | 1/2016 | Kanai | .................. H04N 5/2628 |
| | | | 348/39 |
| 2020/0230499 A1 * | 7/2020 | Buser | .................... A63F 13/352 |
| 2021/0168301 A1 * | 6/2021 | Iwakiri | ................ H04N 13/243 |

FOREIGN PATENT DOCUMENTS

| | | |
|---|---|---|
| JP | H09252428 | 9/1997 |
| JP | 2002262179 | 9/2002 |
| JP | 2004120360 | 4/2004 |
| JP | 2004185240 | 7/2004 |
| JP | 2007241804 | 9/2007 |

* cited by examiner

*Primary Examiner* — Thai Q Tran
*Assistant Examiner* — Jose M Mesa
(74) *Attorney, Agent, or Firm* — JCIPRNET (57) ABSTRACT

A video processing device includes a state memory storing a plurality of setting states of each setting related to video processing; a state applying processor configured to apply the setting states to the settings related to the video processing; a history memory setting a series of changes in the settings related to the video processing as a change history of one group and store a plurality of change histories of the one group; a history reproduction processor reproducing the series of changes of the settings; an execution sequence memory configured to store a sequence of the setting states to be applied among the plurality of setting states and the change histories; and a sequencer configured to execute the application of the setting states by the state applying processor and the reproduction of the change histories by the history reproduction processor in the sequence stored in the execution sequence memory.

18 Claims, 9 Drawing Sheets

PRESET MEMORY TABLE 11b

| SETTING ITEM / NAME | PGM CH | PinP & KEY 1 | PinP & KEY 2 | DSK 1 | DSK 2 | ... |
|---|---|---|---|---|---|---|
| MEMORY 1 | FIRST INPUT TERMINAL | ON | OFF | ON | OFF | ... |
| MEMORY 2 | THIRD INPUT TERMINAL | ON | OFF | ON | OFF | ... |
| MEMORY 3 | SEVENTH INPUT TERMINAL | OFF | ON | OFF | ON | ... |
| ... | | | | | | |

FIG. 4(a)

MACRO TABLE 11c

| NAME | EVENT No. | SETTING ITEM | SETTING VALUE |
|---|---|---|---|
| MACRO 1 | 1 | PinP & KEY 1 | ON |
| | 2 | DSK 1 | ON |
| | 3 | PinP & KEY 2 | ON |
| | 4 | PGM CH | FIRST INPUT TERMINAL |
| | 5 | DSK 2 | OFF |
| MACRO 2 | 1 | PinP & KEY 2 | ON |
| | 2 | DSK 2 | ON |
| | 3 | PinP & KEY 2 | OFF |
| | 4 | PGM CH | FIFTH INPUT TERMINAL |
| | 5 | DSK 1 | OFF |
| ... | | | |

FIG. 4(b)

SEQUENCER TABLE 11d

| STEP | TYPE | SETTING VALUE | PRE-CHANGE SETTING VALUE | TEMPORARY MEMORY |
|---|---|---|---|---|
| 1 | PGM CH CHANGE | SECOND INPUT TERMINAL | PGM CH: FIRST INPUT TERMINAL | – |
| 2 | PRESET MEMORY | MEMORY 2 | PRESET MEMORY: TEMPORARY MEMORY T2 | TEMPORARY MEMORY T2 |
| 3 | PRESET MEMORY | MEMORY 3 | PRESET MEMORY: MEMORY 2 | – |
| 4 | MACRO | MACRO 1 | PGM CH: THIRD INPUT TERMINAL<br>PinP & KEY 1 : ON<br>DSK 1 : OFF<br>PinP & KEY 2 : OFF<br>DSK 1 : ON | |
| ⋮ | | | | |

FIG. 5(a)

TEMPORARY MEMORY T2

| SETTING ITEM | SETTING VALUE |
|---|---|
| | FIRST INPUT TERMINAL |
| PGM CH | |
| PinP & KEY 1 | ON |
| PinP & KEY 2 | OFF |
| DSK 1 | ON |
| DSK 2 | OFF |
| ⋮ | |

FIG. 5(b)

SETTING VALUE MEMORY 12a

| SETTING ITEM | SETTING VALUE |
|---|---|
| PRESET MEMORY | MEMORY 2 |
| | THIRD INPUT TERMINAL |
| PGM CH | |
| PinP & KEY 1 | ON |
| PinP & KEY 2 | OFF |
| DSK 1 | ON |
| DSK 2 | OFF |
| ⋮ | |

FIG. 5(c)

SETTING VALUE MEMORY 12a

| SETTING ITEM | SETTING VALUE |
|---|---|
| PRESET MEMORY | NON-MATCH |
| | FOURTH INPUT TERMINAL |
| PGM CH | |
| PinP & KEY 1 | ON |
| PinP & KEY 2 | OFF |
| DSK 1 | ON |
| DSK 2 | OFF |
| ⋮ | |

VIDEO PROCESSING DEVICE AND VIDEO PROCESSING METHOD

CROSS-REFERENCE TO RELATED APPLICATION

This application claims the priority benefits of Japanese application no. 2021-087622, filed on May 25, 2021. The entirety of the above-mentioned patent application is hereby incorporated by reference herein and made a part of this specification.

BACKGROUND

Technical Field

The present disclosure relates to a video processing device and a video processing method.

Description of Related Art

Patent Document 1 discloses a video mixer device including buttons Sc1 to Sc8 and a store button St. While the store button St is pressed, setting states of switches of a panel operator 4A at that time point are stored in the buttons Sc1 to Sc8 by pressing the buttons Sc1 to Sc8. When any of the buttons Sc1 to Sc8 is pressed after the storing, the setting states of the switches of the panel operator 4A stored in the buttons Sc1 to Sc8 can be reproduced.

PATENT DOCUMENTS

[Patent Document 1] Japanese Patent Laid-Open No. 2002-262179 (for example, paragraph 0023 and FIG. 2)

However, in the video mixer device of Patent Document 1, switching of the setting states is executed when a worker operates the buttons Sc1 to Sc8. For example, when scenes 1 to 8 which are the setting states are stored in the buttons Sc1 to Sc8, respectively, and the setting states are switched dynamically in the sequence of the scenes 1, 5, and 3, it is necessary for the worker to press the buttons Sc1, Sc5, and Sc3 in that sequence. When the setting states are switched in sequence, the worker has to accurately press the buttons Sc1 to Sc8 in that sequence, and thus there is the problem that a work load increases.

SUMMARY

According to an embodiment, a video processing device includes a state memory configured to store a plurality of setting states of each setting related to video processing; a state applying processor configured to apply the setting states stored in the state memory to the settings related to the video processing; a history memory configured to set a series of changes in the settings related to the video processing as a change history of one group and store a plurality of change histories of the one group; a history reproduction processor configured to reproduce the series of changes of the settings related to the video processing in the change histories by changing the settings related to the video processing based on the change histories stored in the history memory; an execution sequence memory configured to store a sequence of the setting states to be applied among the plurality of setting states stored in the state memory and the change histories of the one group to be reproduced among the plurality of change histories of the one group stored in the history memory; and a sequencer configured to execute the application of the setting states by the state applying processor and the reproduction of the change histories by the history reproduction processor in the sequence stored in the execution sequence memory.

According to another embodiment, a video processing device includes: a state storage part configured to store a plurality of setting states of each setting related to video processing; a state applying part configured to apply the setting states stored in the state storage part to the settings related to the video processing; a history storage part configured to set a series of changes in the settings related to the video processing as a change history of one group and store a plurality of change histories of the one group; a history reproduction part configured to reproduce the series of changes of the setting related to the video processing in the change histories by changing the settings related to the video processing based on the change histories stored in the history storage part; an execution sequence storage part configured to store a sequence of the setting states to be applied among the plurality of setting states stored in the state storage part and the change histories of the one group to be reproduced among the plurality of change histories of the one group stored in the history storage part; and a sequential execution part configured to execute the application of the setting states by the state applying part and the reproduction of the change histories by the history reproduction part in the sequence stored in the execution sequence storage part.

According to still another embodiment, a video processing method includes: storing a plurality of setting states of each setting related to video processing; storing a sequence of the setting states to be applied among the plurality of stored setting states; applying the stored setting states to the settings related to the video processing; and sequentially executing the application of the setting states to be applied in the stored sequence.

According to still another embodiment, a video processing method includes: setting a series of changes of a setting related to video processing as a change history of one group; storing a plurality of change histories of the one group; storing a sequence of the change histories of the one group to be reproduced among the plurality of stored change histories of the one group;
reproducing the series of changes in the setting related to the video processing in accordance with the change histories by changing the setting related to the video processing based on the stored change history; and executing reproduction of the change histories in the stored sequence.

BRIEF DESCRIPTION OF THE DRAWINGS

FIG. 7(*a*) is a flowchart illustrating a PGM applying process, FIG. 7(*b*) is a flowchart illustrating a video output process, FIG. 7(*c*) is a flowchart illustrating a preset memory applying process, and FIG. 7(*d*) is a flowchart illustrating a macro reproduction process.

DESCRIPTION OF THE EMBODIMENTS

The disclosure provides a video processing device and a video processing method capable of reducing a work load of a worker in application of sequenced setting states.

Figure 1:
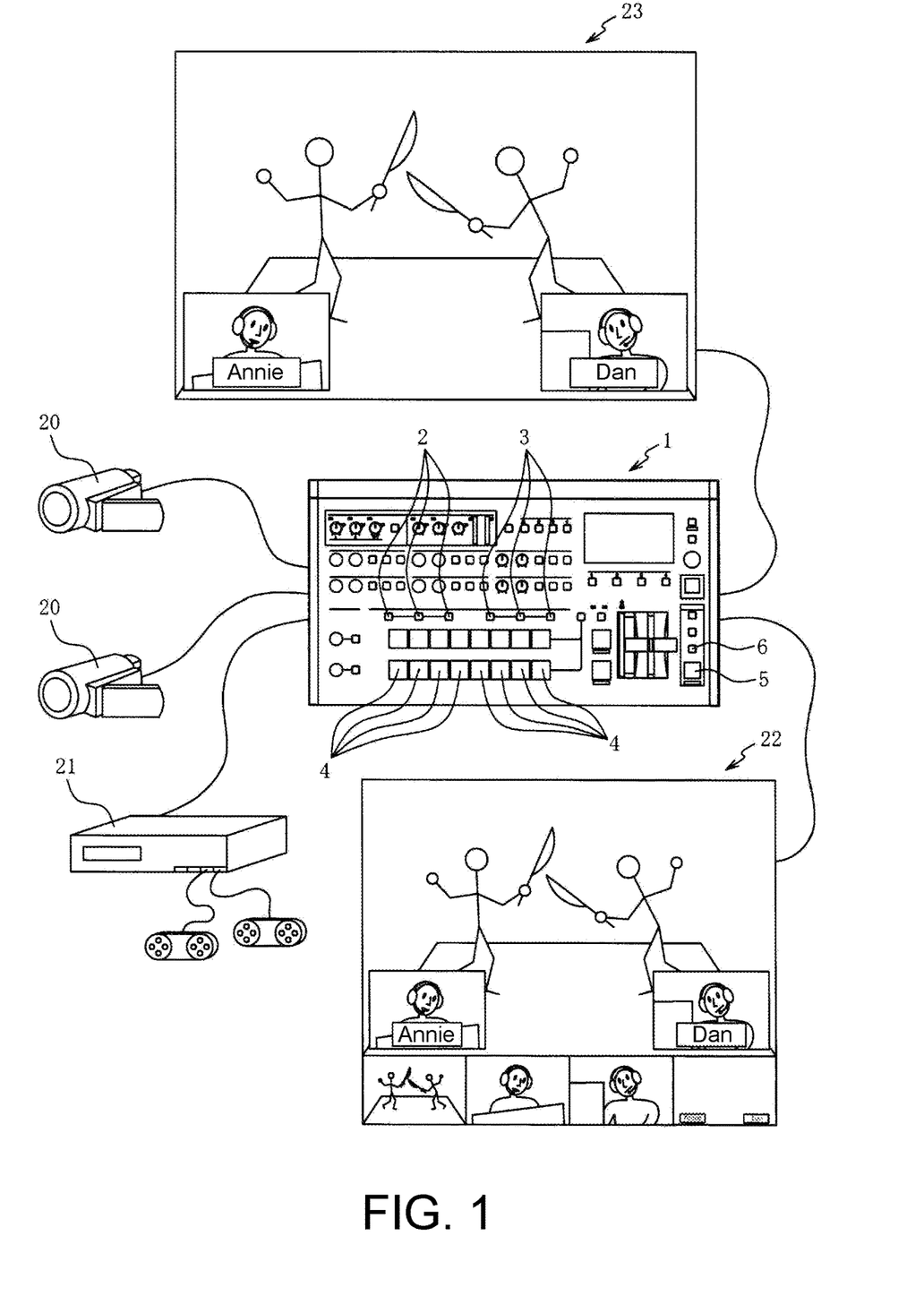
FIG. 1 is a diagram illustrating an overview of a switcher

Hereinafter, preferred embodiments will be described with reference to the appended drawings. An overview of a switcher 1 according to an embodiment will be described with reference to FIG. 1. FIG. 1 is a diagram illustrating an overview of the switcher 1. The switcher 1 is a device (a video processing device) that outputs an output video which is a video in which predetermined video processing is executed on a moving image Mv input from a video camera 20, a video game device 21, a hard disk recorder (not illustrated), or the like. The switcher 1 includes preset buttons 2, macro buttons 3, PGM change buttons 4, a next button 5, and a back button 6. The preset buttons 2 are buttons to which setting states of each setting of video processing to be applied are allocated.

As an example of video processing in the switcher 1 according to the embodiment, "PGM CH" for designating input sources (in FIG. 3, a first input terminal 16*a* to an eighth input terminal 16*h* to be described below) of videos mainly displayed in an output video, "PinP & KEY1, 2" for providing small windows in the output video and displaying other videos in the small windows, and "DSK1, 2" for adding a text string (telop) to the output video can be exemplified, but other types of video processing may also be provided.

"PinP & KEY1" is a setting for the small window (a lower left portion of the output video in FIG. 1) provided in the output video and "PinP & KEY2" is a setting for the small window (a lower right portion of the output video in FIG. 1) provided separately from "PinP & KEY1" in the output video. The small windows of "PinP & KEY1, 2" are displayed with any sizes at any positions in the output video. The shapes of the small windows of "PinP & KEY1, 2" are not limited to the rectangles illustrated in FIG. 1 and may be other shapes such as circles or stars.

"DSK1" is a setting for a layer (a text string added to the lower left portion of the output video in FIG. 1) superimposed on the output video and "DSK2" is a setting for a layer (a text string added to the lower right of the output video in FIG. 1) further superimposed on the layer of "DSK1." Other information such as images may be added to the layers of "DSK1 and 2" without being limited to the text strings.

The "setting states of each setting of video processing" allocated to the preset buttons 2 are setting states of the settings for some or all of the video processing provided in the switcher 1, such as "PGM CH." Hereinafter, the "setting states of each setting of video processing" are also referred to as "preset memories."

Figure 4A:
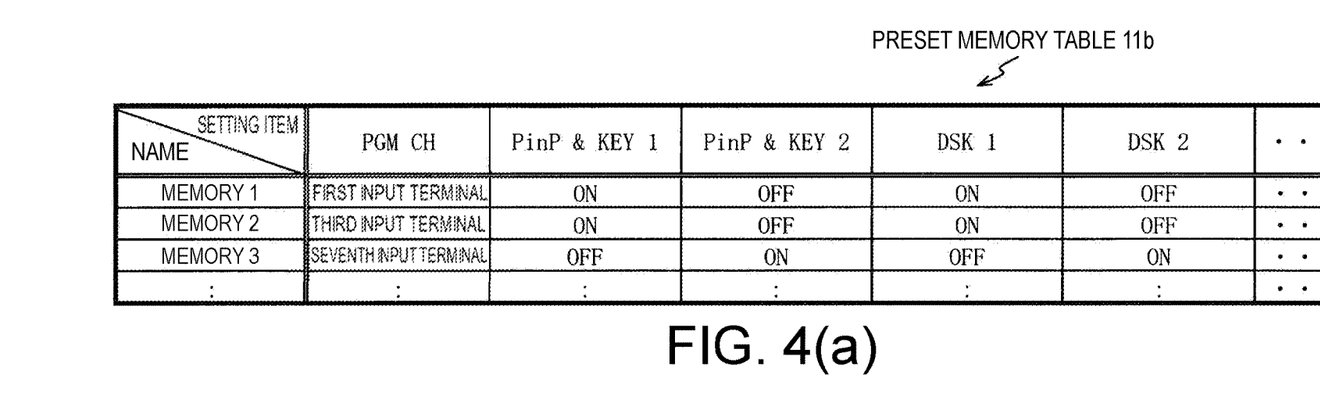
FIG. 4(a) is a diagram schematically illustrating a preset memory table and FIG. 4(b) is a diagram schematically illustrating a macro table.

In the switcher 1 according to the embodiment, the plurality of preset buttons 2 is provided and the preset memories stored in a preset memory table 11*b* to be described below with reference to FIG. 4(*a*) are allocated to the preset buttons 2. When the preset buttons 2 are pressed, the corresponding preset memory is acquired from the preset memory table 11*b* and is applied to the output video. The preset memories are not limited to the setting states of the settings for all the video processing provided in the switcher 1 and may be, for example, setting states of some settings for the video processing as in only "PGM CH" and "PinP & KEY1."

The macro buttons 3 are buttons allocated to a change history of one group in which a series of changes in the settings related to the video processing are stored in the changed sequence. As the change history, for example, "PGM CH" is changed to the second input terminal 16*b* to be described below, "5-second standby" is subsequently executed in this state, "PinP & KEY1" is subsequently "not displayed," and "DSK2" is simultaneously "displayed." That is, the change history includes standing by for a predetermined time interval in addition to the series of changes in the setting related to the video processing. Hereinafter, "change history" is also referred to as "macro."

Examples of schemes for generating the macros includes a scheme for recording an operation of an operator (not illustrated) to individually set "PGM CH," "PinP & KEY1," or the like provided in the switcher 1 and a scheme for inputting an event corresponding to an operation of "PGM CH," "PinP & KEY1," or the like in a screen displayed on an operation monitor 22 to be described below. However, the macros may be generated using other schemes.

Figure 4B:
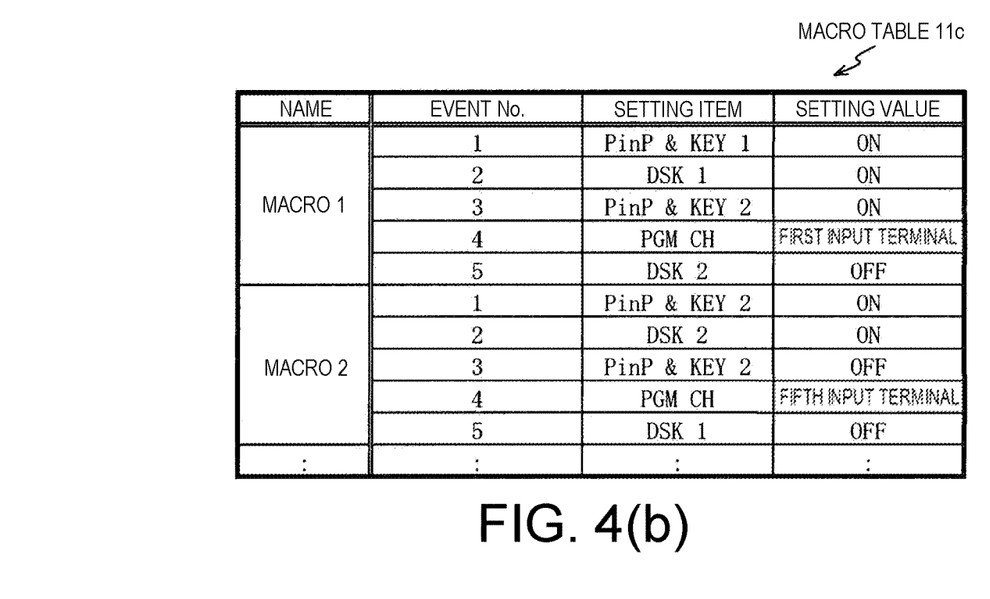

In the switcher 1 according to the embodiment, the plurality of macro buttons 3 is provided. Macros stored in a macro table 11*c* to be described below with reference to FIG. 4(*b*) are allocated to the macro buttons 3. When the macro buttons 3 are pressed, the setting related to the video processing stored in the allocated macros is applied to the output video in the stored sequence.

The PGM change button 4 is a button for selecting an input source of a video displayed mainly in the output video. In the embodiment, the plurality of PGM change buttons 4 is provided, and allocated to the first input terminal 16*a* to the eighth input terminal 16*h* to be described below. When the PGM change buttons 4 are pressed, the input sources of the videos displayed mainly in the output video are changed to the first input terminal 16*a* to the eighth input terminal 16*h* allocated to the PGM change buttons 4.

Figure 5A:
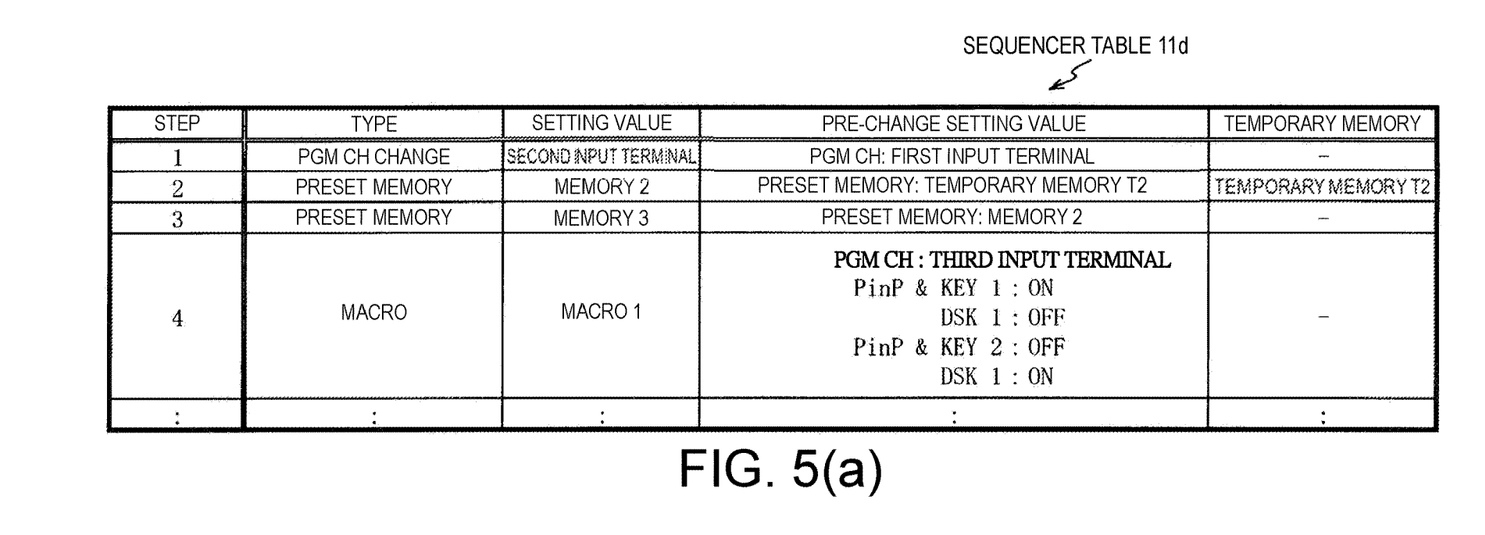
FIG. 5(a) is a diagram schematically illustrating a sequencer table.

The next button 5 is a button for executing application of the preset memories stored in a sequencer table 11*d* to be described below in FIG. 5(*a*), reproduction of the macros, or changing of the PGM CH in a sequence stored in the sequencer table 11*d*. On the other hand, the back button 6 is a button for re-executing the application of the preset memories, the reproduction of the macros, or the changing of the PGM CH executed immediately previously by pressing the next button 5.

The video camera 20 inputting the captured moving image Mv, a video game device 21 inputting the moving image Mv in accordance with a result of a video game of a user, the editing operation monitor 22 displaying additional states of the video processing in the switcher 1, and an external monitor 23 displaying the output video are connected to the switcher 1. As a resolution of the input moving image Mv, "1980 pixels in the horizontal direction and 1080 pixels in the vertical direction" is exemplified, but the resolution of the moving image Mv may be higher or lower.

In the switcher 1 according to the embodiment, the application of the preset memories, the reproduction of the macros, or the changing of the PGM CH is executed in the sequence stored in the sequencer table 11d by pressing the next button 5. That is, in the application of the preset memories, the reproduction of the macros, or the changing of the PGM CH in the sequence, it is not necessary to designate the preset buttons 2, the macro buttons 3, or the PGM change buttons 4 to which the preset memories to be applied or the macros to be reproduced are designated in the sequence every time. Thus, a work load of a worker can be reduced in the application of the preset memories, the reproduction of the macros, or the changing of the PGM CH in the sequence.

Further, by pressing the back button 6, it is possible to retrospectively re-execute the application of the preset memories, the reproduction of the macros, or the changing of PGM CH, executed by pressing the immediately previous next button 5. Thus, because it is not necessary to store the preset memories or the like to be retrospectively applied in the sequencer table 11d, it is possible to reduce the work load in re-execution of a worker and realize flexible video processing. As described above, the worker who is a single person can also realize the sequenced execution of the application of the preset memories, the reproduction of the macros, and the changing of the PGM CH.

Figure 2:
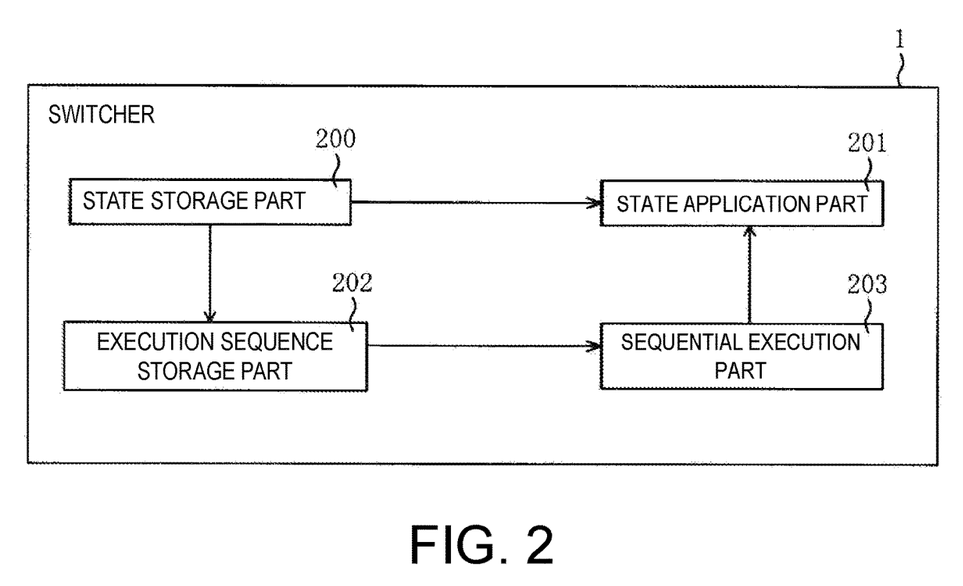
FIG. 2 is a functional block diagram illustrating the switcher.

Next, a function of the switcher 1 will be described with reference to FIG. 2. FIG. 2 is a functional block diagram illustrating the switcher 1. As illustrated in FIG. 2, the switcher 1 includes a state storage part 200, a state applying part 201, an execution sequence storage part 202, and a sequential execution part 203.

The state storage part 200 is a part that stores a plurality of setting states (that is, the foregoing preset memories) of each setting related to the video processing and is realized by a flash ROM 11 to be described below with reference to FIG. 3. The state applying part 201 is a part that applies the setting states stored in the state storage part 200 to the setting related to the video processing and is realized by a CPU 10 to be described below with reference to FIG. 3. The execution sequence storage part 202 is a part that stores a sequence of the setting states to be applied among the plurality of setting states stored in the state storage part 200 and is realized by the flash ROM 11. The sequential execution part 203 is a part that executes the application of the setting states by the state applying part 201 in the sequence stored in the execution sequence storage part 202 and is realized by the CPU 10.

In the switcher 1, the sequence of the setting states to be applied among the plurality of setting states of the state storage part 200 is stored in the execution sequence storage part 202, and the sequential execution part 203 executes the application of the setting states by the state applying part 201 in the sequence stored in the execution sequence storage part 202. That is, because the sequence of the setting states to be applied is stored in the execution sequence storage part 202, it is not necessary for the worker to designate the sequence of the setting states to be applied every time in the application of the sequenced setting states. Thus, it is possible to reduce the work load of the worker in the application of the sequenced setting states.

Next, an electrical configuration of the switcher 1 will be described with reference to FIG. 3 to FIG. 5(d). FIG. 3 is a block diagram illustrating an electrical configuration of the switcher 1. As illustrated in FIG. 3, the switcher 1 includes the CPU 10, the flash ROM 11, and the RAM 12 which are connected to an input/output port 14 via a bus line 13. The preset buttons 2, the macro buttons 3, the PGM change buttons 4, the next button 5, the back button 6, and the video processing device 15 are further connected to the input/output port 14.

Figure 6:
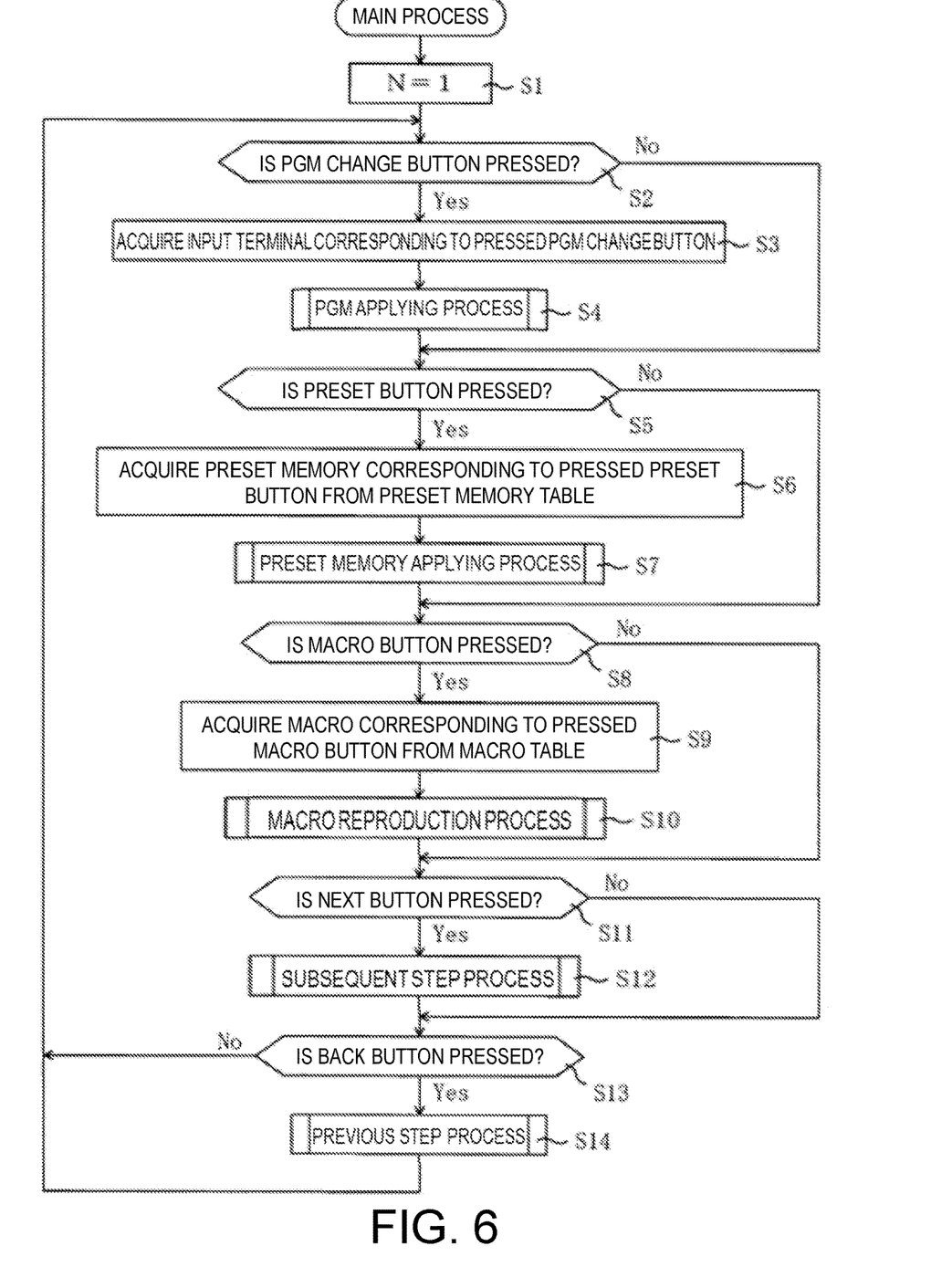
FIG. 6 is a flowchart illustrating a main process.

The CPU 10 is an arithmetic device that controls each part connected via the bus line 13. The flash ROM 11 is a rewritable nonvolatile storage device that stores fixed value data, a program executed by the CPU 10, and the like and stores a video processing program 11a, the preset memory table 11b, the macro table 11c, and the sequencer table 11d. When the CPU 10 executes the video processing program 11a, a main process of FIG. 6 is executed.

The preset memory table 11b is a data table in which the foregoing preset memories are stored. The macro table 11c is a data table in which the foregoing macros are stored. The sequencer table 11d is a data table in which the preset memories applied in an operation of the foregoing next button 5 or back button 6 and/or the macros to be reproduced are stored. The preset memory table 11b, the macro table 11c, and the sequencer table 11d will be described with reference to FIGS. 4, 5(a), and 5(b).

FIG. 4(a) is a diagram schematically illustrating a preset memory table 11b. In the preset memory table 11b, names (memory 1, 2, . . . ) and setting values of settings ("PGM CH," "PinP & KEY1," . . . ) of the video processing are stored for each preset memory. "Names" stored in the preset memory table 11b are "types" stored in the sequencer table 11d (FIG. 5(a)) to be described below or names stored in the setting value memory 12a (FIGS. 5(c) and 5(d)), are the preset memories acquired based on them, and are used to indicate the preset memories stored in the preset memory table 11b.

FIG. 4(b) is a diagram schematically illustrating the macro table 11c. In the macro table 11c, a name (macro 1, macro 2, . . . ), and a setting item and a setting value of a setting of the video processing to be changed are stored for each macro. Specifically, "event No." indicating the sequence of the setting to be changed in the macro stored in the macro table 11c (hereinafter also referred to as an "event"), a setting item ("PGM CH," "PinP & KEY1," . . . ) of the setting of the corresponding video processing in the sequence, and a setting value of the setting item are stored. Although not illustrated, for an event of standing by for the foregoing predetermined time interval, "standby" is stored in the setting item and a standby time interval is stored in the setting value in the macro table 11c.

Although not illustrated, in the macro table 11c, an execution flag in which it is set whether the event is executed without waiting for completion of an immediately previous event or the event is executed after the completion of the immediately previous event is provided for each event No. Specifically, in the execution flag, when the event is executed without waiting for the completion of the immediately previous event, "simultaneous execution" is set. When the event is executed after the completion of the immediately previous event, "sequential execution" is set.

The names stored in the macro table 11c are the names stored in the types of the sequencer table 11d, are the macros acquired based on the sequencer table 11d, and are used to indicate the macros stored in the macro table 11c, like the names of the preset memory table 11b.

FIG. 5(a) is a diagram schematically illustrating the sequencer table 11d. In the sequencer table 11d, the preset memory to be applied, "type" which is the macro to be reproduced or "PGM CH" to be changed, "setting value" in accordance with the type, "pre-change setting value," and "temporary memory" are stored for each "step" which is a sequence changed through an operation of the foregoing next button 5 or back button 6.

In the setting value, the names of the preset memory table 11*b* corresponding to the preset memories to be applied, the names of the macro table 11*c* corresponding to the macros to be reproduced, or the first input terminal 16*a* to the eighth input terminal 16*h* to be described in the PGM CH to be changed are stored.

The disclosure is not limited to the setting value in which the names of the preset memory table 11*b* or the names of the macro table 11*c* corresponding to the preset memories to be applied or the macros are stored. For example, in the setting value, information indicating positions at which the preset memories to be applied are stored in the preset memory table 11*b* or information indicating positions at which the macros to be applied are stored in the macro table 11*c* may be stored.

In the pre-change setting value, a setting value of the setting of the video processing changed by executing the step is stored. For example, in step "1" in FIG. 5(*a*), the type is "PGM CH change." Therefore, when "PGM CH" before the change is "first input terminal," "first input terminal" is stored in the pre-change setting value. In the pre-change setting value, not only the setting value of the setting of the video processing changed by executing the step but also a setting value of a setting of other video processing may be stored.

Figure 5B:
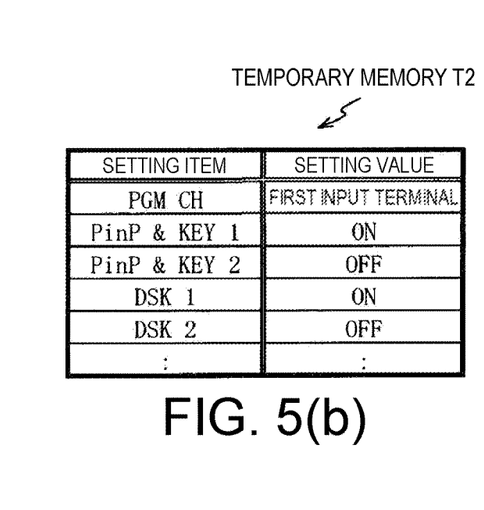
FIG. 5(b) is a diagram schematically illustrating a temporary memory.

When the type is "preset memory," the preset memory immediately before the change in the step is stored in the pre-change setting value. For example, like step 3 in FIG. 5(*a*), the setting value of step 2 which is the previous step is "memory 2." Therefore, "memory 2" is stored in the pre-change setting value of step 3. On the other hand, like step 2 in FIG. 5(*a*), when "type" of the previous step is not the preset memory or the setting of the video processing is changed through an operation on an operator (not illustrated) provided in the switcher 1, the setting value of the setting of the video processing before the change is stored in "temporary memory" as in the preset memory. Here, the temporary memory T2 will be described with reference to FIG. 5(*b*).

FIG. 5(*b*) is a diagram schematically illustrating the temporary memory T2. In FIG. 5(*b*), a temporary memory T2 stored in the temporary memory will be described with reference to step 2 of the sequencer table 11*d* of FIG. 5(*a*). However, a configuration in the case of storing in the temporary memory in another step of the sequencer table 11*d* is the same as the temporary memory T2, and description thereof will be omitted. As illustrated in FIG. 5(*b*), the setting state (that is, the preset memory) of each setting of the video processing immediately before step 3 of the sequencer table 11*d* is executed is stored in the temporary memory T2.

FIG. 5(*a*) will be referred to again. The pre-change setting value and the temporary memory in the sequencer table 11*d* are used when step N-1 which is executed immediately before step N is executed when the back button 6 is pressed. Specifically, when the next button 5 is pressed, the setting of the video processing at that time point is first stored in the temporary memory and the pre-change setting value of change of step N in accordance with "type" ("PGM CH change," "preset memory," or "macro") of step N of the sequencer table 11*d* to be executed. Thereafter, "PGM CH change," "preset memory," or "macro" set in step N is executed.

Thereafter, when the back button 6 is pressed, the temporary memory and the pre-change setting value of step N are first applied to the setting of the video processing. Thus, the setting of the video processing is the setting immediately before step N is executed.

Thereafter, by applying the temporary memory and the pre-change setting value of step N-1, the setting of the video processing can be the same as the setting immediately before step N-1 is executed. In this state, by executing the application of the preset memory, the reproduction of the macro, or the changing of the PGM CH in step N-1, it is possible to accurately reproduce step N-1 executed by pressing the next button 5. The temporary memory and the pre-change setting value stored in the sequencer table 11*d* are "restoration information."

The temporary memory and the pre-change setting value are not limited to the temporary memory and the pre-change setting value stored in the sequencer table 11*d* and may be stored in, for example, the RAM 12 to be described below. In this case, in the sequencer table 11*d*, a position (address) of the temporary memory and the pre-change setting value corresponding to the step is stored in the RAM 12 may be stored.

Figure 3:
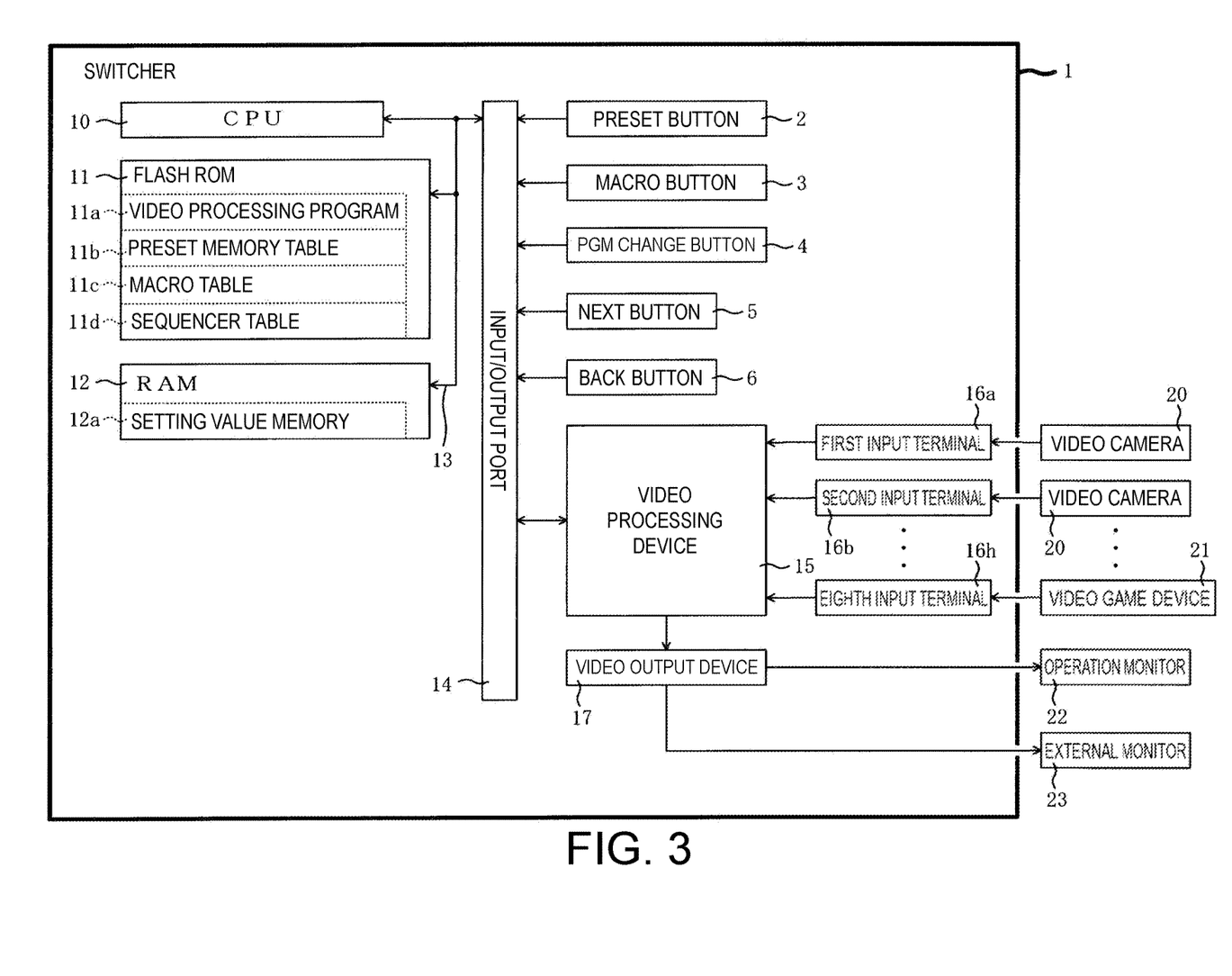
FIG. 3 is a block diagram illustrating an electrical configuration of the switcher.
Figure 5C:
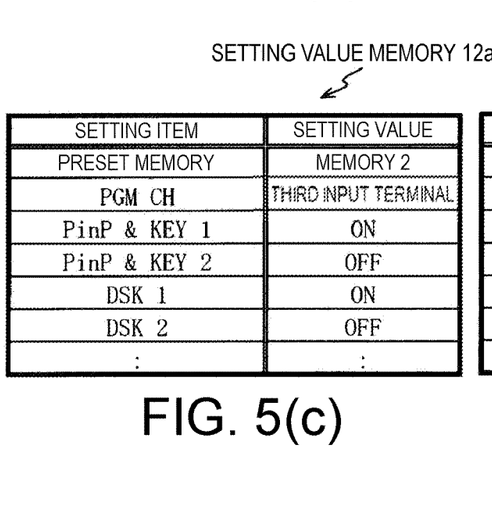
FIG. 5(c) is a diagram schematically illustrating a setting value memory when a preset memory is applied.
Figure 5D:
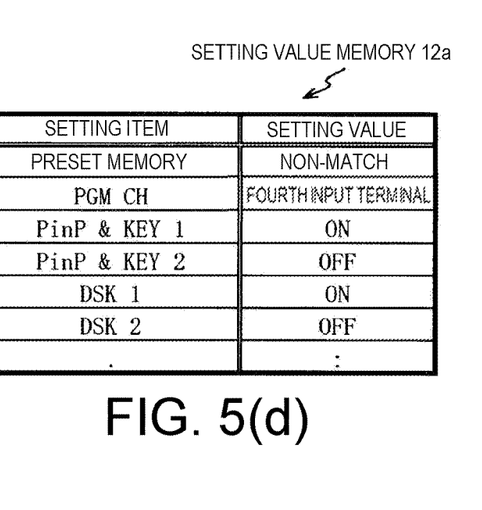
FIG. 5(d) is a diagram schematically illustrating a setting value memory when setting of video processing is changed through an operation of another operator in a case in which the preset memory is not applied or after the preset memory is applied.

FIG. 3 is referred back. The RAM 12 is a memory that stores various kinds of work data, flags, and the like in a rewritable manner when the CPU 10 executes a program. The setting value memory 12*a* in which the setting value of each setting of the video processing is stored is provided. The setting value memory 12*a* will be described with reference to FIGS. 5(*b*) and 5(*c*).

FIG. 5(*c*) is a diagram schematically illustrating the setting value memory 12*a* when the preset memory is applied and FIG. 5(*d*) is a diagram schematically illustrating the setting value memory 12*a* when setting of video processing is changed through an operation of another operator in a case in which the preset memory is not applied or after the preset memory is applied. As illustrated in FIGS. 5(*c*) and 5(*d*), names of the preset memories applied to the setting of the video processing and setting values applied to each setting of the video processing are stored in the setting value memory 12*a*.

When the preset memory is applied to the setting of the video processing, as illustrated in FIG. 5(*c*), the name of the preset memory table 11*b* showing in the preset memory is stored in "preset memory." On the other hand, when the preset memory is not applied or when the setting of the video processing is changed through an operation of another operator after the application of the preset memory, as illustrated in FIG. 5(*d*), "non-match" is stored in "preset memory."

FIG. 3 is referred back. The video processing device 15 is an arithmetic device that executes image processing in response to an instruction from the CPU 10. The first input terminal 16*a* to the eighth input terminal 16*h* to which images to be subjected to image processing by the video processing device 15 are input and the video output device 17 that outputs images (video) subjected to the image processing by the video processing device 15 are connected to the video processing device 15.

The foregoing video camera 20 or video game device 21 are connected to the first input terminal 16*a* to the eighth input terminal 16*h*, and the moving image Mv from the video camera 20 or the video game device 21 is input to the video processing device 15 via the first input terminal 16*a* to the eighth input terminal 16*h*. The foregoing operation monitor 22 and external monitor 23 are connected to the video output device 17, the corresponding videos are output to the operation monitor 22 and the external monitor 23 via the video output device 17.

Next, a main process executed by the CPU 10 of the PC 1 will be described with reference to FIGS. 6 to 9. FIG. 6 is a flowchart illustrating the main process. The main process is a process executed when power is supplied to the switcher 1.

In the main process, 1 is first set in a counter variable N indicating the step of the sequencer table 11d (S1). After the process of S1, it is checked whether the PGM change button 4 is pressed (S2). When the PGM change button 4 is pressed in the process of S2 (Yes in S2), the input terminal corresponding to the pressed PGM change button 4, that is, one of the first input terminal 16a to the eighth input terminal 16h, is acquired (S3). After the process of S3, a PGM applying process (S4) is executed. Here, the PGM applying process will be described with reference to FIG. 7(a).

Figure 7A:
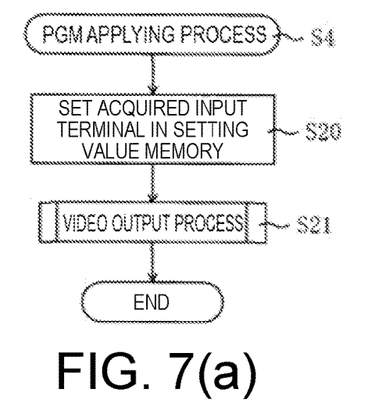

FIG. 7(a) is a flowchart illustrating a PGM applying process. In the PGM applying process, the acquired input terminal is first set in "PGM CH" of the setting value memory 12a (S20). At this time, "non-match" is set in the preset memory of the setting value memory 12a.

After the process of S20, the video output process (S21) is executed, and then the PPM applying process ends. Here, the video output process will be described with reference to FIG. 7(b).

Figure 7B:
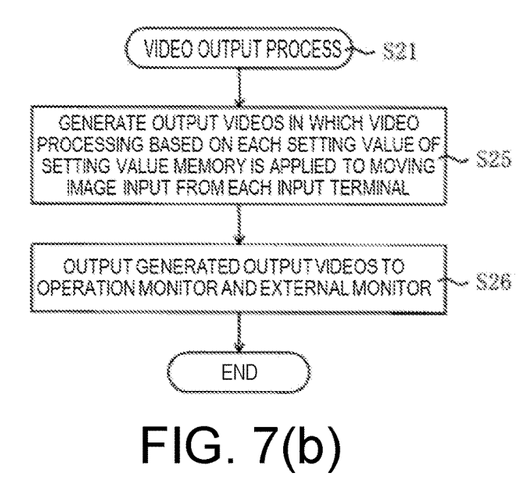

FIG. 7(b) is a flowchart illustrating a video output process. In the video output process, output videos in which video processing based on each setting value of the setting value memory 12a is added to the moving image Mv input from the first input terminal 16a to the eighth input terminal 16h are generated (S25). The output videos generated in the process of S21 are a video output to the operation monitor 22 and a video output to the external monitor 23.

After the process of S25, the generated output videos are output to the operation monitor 22 and the external monitor 23 via the video output device 17 (S26) and the video output process ends. Through the video output process, the output videos based on the setting value memory 12a are generated and outputs to the operation monitor 22 and the external monitor 23.

FIG. 6 is referred back. When the PGM change button 4 is not pressed in the process of S2 (No in S2), the processes of S3 and S4 are skipped. After the processes of S2 and S4, it is checked whether the preset button 2 is pressed (S5).

When the preset button 2 is pressed in the process of S5 (Yes in S5), the preset memory corresponding to the pressed preset button 2 is acquired from the preset memory table 11b (S6). Specifically, the preset memories stored in the preset memory table 11b are respectively allocated to the preset buttons 2, and the preset memory of the preset memory table 11b corresponding to the pressed preset button 2 is acquired.

After the process of S6, the preset memory applying process (S7) is executed. Here, the preset memory applying process will be described with reference to FIG. 7(c).

Figure 7C:
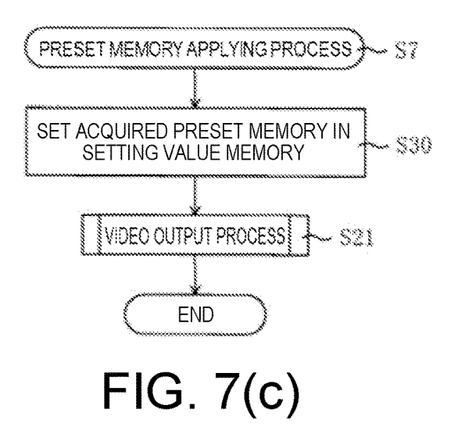

FIG. 7(c) is a flowchart illustrating a preset memory applying process. In the preset memory applying process, the acquired preset memory is first set in the setting value memory 12a (S30). At this time, in "preset memory" of the setting value memory 12a, the name corresponding to the acquired preset memories is acquired from the preset memory table 11b and is set. After the process of S30, the foregoing video output process of S21 is executed and the preset memory applying process ends. Through the preset memory applying process, the acquired preset memory is reflected in the setting value memory 12a and is reflected in the output video.

FIG. 6 is referred back. When the preset button 2 is not pressed in the process of S5 (No in S5), the processes of S6 and S7 are skipped. After the processes of S5 and S7, it is checked whether the macro button 3 is pressed (S8). When the macro button 3 is pressed in the process of S8 (Yes in S8), the macro corresponding to the pressed macro button 3 is acquired from the macro table 11c (S9). After the process of S9, a macro reproduction process (S10) is executed. Here, the macro reproduction process will be described with reference to FIG. 7(d).

Figure 7D:
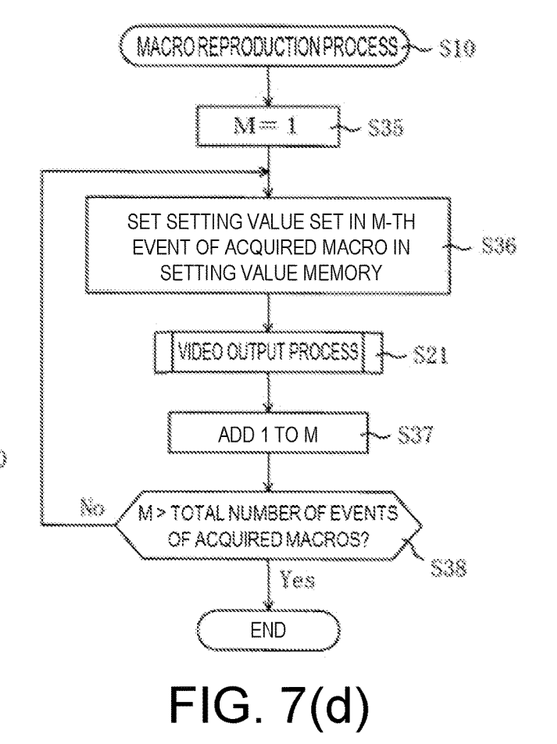

FIG. 7(d) is a flowchart illustrating the macro reproduction process. The macro reproduction process, 1 is first set in a counter variable M indicating an event No. of the macro (S35). After the process of S35, the setting value of the setting related to the video processing set in an M-th event of the acquired macro is set in the setting value memory 12a (S36). At this time, "non-match" is set in "preset memory" of the setting value memory 12a. After the process of S36, the foregoing video output process of S21 is executed.

Thereafter, 1 is added to the counter variable M (S37). After the process of S37, it is checked whether the counter variable M is greater than the total number of events of the acquired macros (S38). When the counter variable M is equal to or less than the total number of events of the acquired macros in the process of S38 (No in S38), the processes of S36 and the subsequent steps are executed. At this time, when the event stored in the macro is the foregoing "standby," the process of S36 is re-executed after a standby process of a time interval set as "setting value" is executed.

When the foregoing execution flag of the event stored in the macro is "simultaneous execution," the event is executed without waiting for completion of the immediately previous event. On the other hand, when the execution flag is "sequential execution," the event is executed after completion of the immediately previous event.

Conversely, when the counter variable M is greater than the total number of events of the acquired macros in the process of S38 (Yes in S38), the macro reproduction process ends. Through the macro reproduction process, the setting value of the setting related to the video processing set in the acquired macro is reflected in the setting value memory 12a in the sequence set in the macro and is reflected in the output video.

FIG. 6 is referred back. When the macro button 3 is not pressed in the process of S8 (No in S8), the processes of S9 and S10 are skipped. After the processes of S8 and S10, it is checked whether the next button 5 is pressed (S11). When the next button 5 is pressed in the process of S11 (Yes in S11), subsequent step process (S12) is executed. Here, the subsequent step process will be described with reference to FIG. 8.

Figure 8:
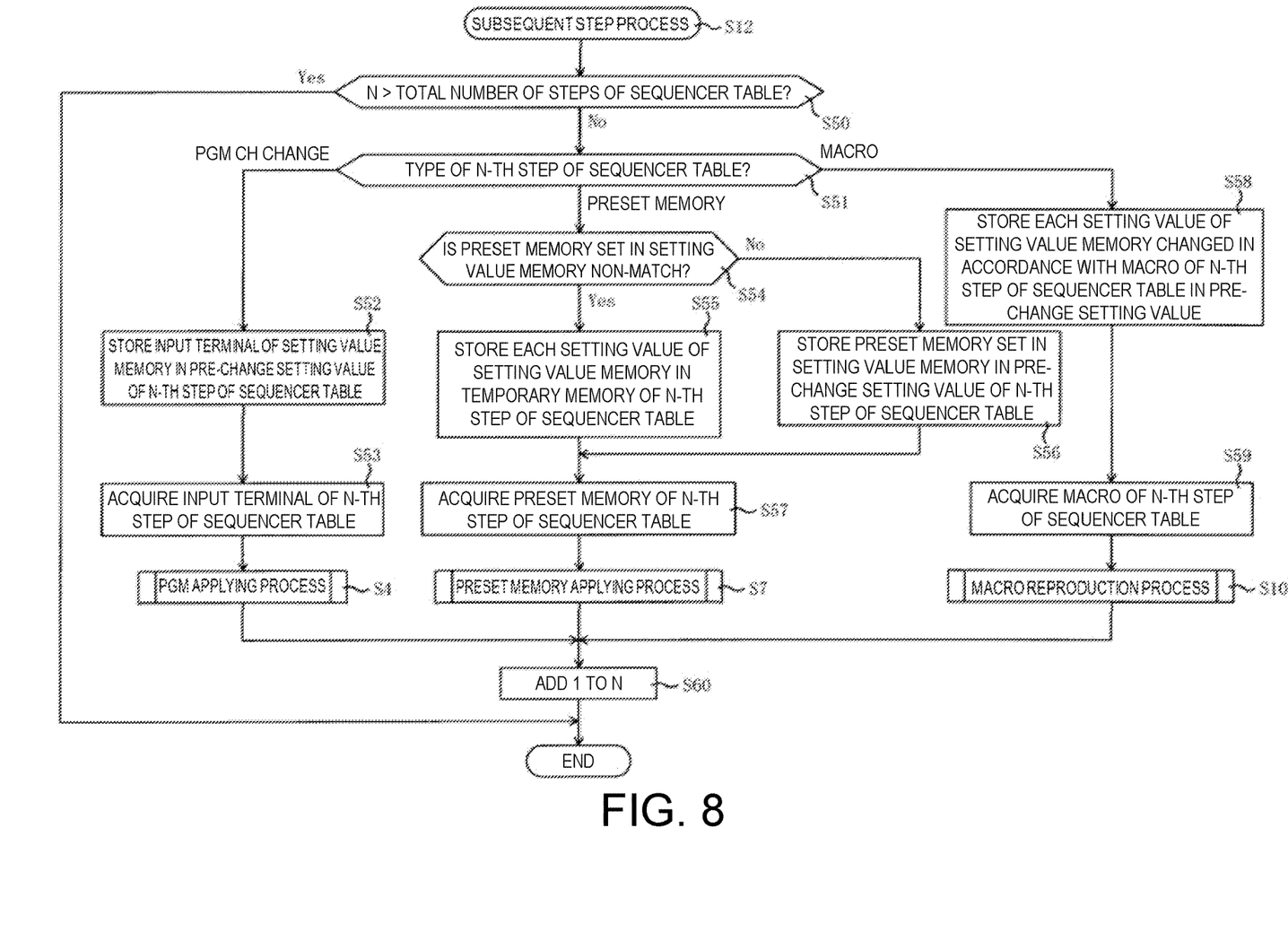
FIG. 8 is a flowchart illustrating a subsequent step process.

FIG. 8 is a flowchart illustrating a subsequent step process. In the subsequent step process, it is checked whether the counter variable N is greater than the total number of steps of the sequencer table 11d (S50). When the counter variable N is equal to or less than the total number of steps of the sequencer table 11d in the process of S51 (No in S50), "type" of the N-th step of the sequencer table 11d is checked (S51).

When "type" of the N-th step of the sequencer table 11d is "PGM CH change" in the process of S51 (PGM CH change in S51), the input terminal stored in "PGM CH" of the setting value memory 12a is first stored in N-th "pre-change setting value" of the sequencer table 11d (S52).

After the process of S52, the input terminal stored in N-th "setting value" of the sequencer table 11d is acquired (S53) and the forgoing PGM applying process of S4 is executed. Then, the input terminal stored in the N-th of the sequencer table 11d is set in the setting value memory 12a, the video processing based on the setting value memory 12a is executed, and thus the moving image My input from the input terminal is output as the output video.

When "type" of the N-th step of the sequencer table 11d is "preset memory" in the process of S51 ("preset memory" in S51), it is first checked whether "preset memory" of the setting value memory 12a is "non-match" (S54).

When "preset memory" of the setting value memory 12a is "non-match" in the process of S54 (Yes in S54), each setting value of the setting value memory 12a is stored in "temporary memory" of the N-th step of the sequencer table 11d in a similar configuration to that of preset memory (S55). At this time, "preset memory: temporary memory TN (where N=1, 2, 3, . . . )" indicating that "temporary memory" is stored is set in "pre-change setting value" of the N-th step of the sequencer table 11d.

Conversely, when "preset memory" of the setting value memory 12a is no "non-match" in the process of S54 (No in S54), the name of the preset memory set in "preset memory" of the setting value memory 12a is stored in "pre-change setting value" of the N-th step of the sequencer table 11d (S56). At this time, when the preset memory stored in the past in "temporary memory" of the N-th step of the sequencer table 11d is stored, the preset memory stored in the past is deleted.

After the processes of S55 and S56, the preset memory of the N-th step of the sequencer table 11d is acquired (S57) and the foregoing preset memory applying process of S7 is executed. Then, the preset memory stored in the N-th of the sequencer table 11d is set in the setting value memory 12a, the video processing based on the setting value memory 12a is executed, and thus the output video based on the preset memory is output.

When "type" of the N-th step of the sequencer table 11d is "macro" in the process of S51 ("macro" in S51), the setting value of the setting which is a setting of the setting value memory 12a and changed in execution of the macro of the N-th step of the sequencer table 11d is stored in "pre-change setting value" of the N-th step of the sequencer table 11d (S58).

After the process of S58, the macro of the N-th step of the sequencer table 11d is acquired (S59) and the foregoing macro process of S10 is executed. Then, the macro is reproduced in the output video by sequentially applying a change in the setting of the video processing stored in the macro stored in the N-th of the sequencer table 11d to the setting value memory 12a.

After the process of S4, S7, or S10, 1 is added to the counter variable (S60). When the counter variable N is greater than the total number of steps of the sequencer table 11d in the process of S51 (Yes in S50) or after the process of S60, the subsequent step process ends.

FIG. 6 is referred back. When the next button 5 is not pressed in the process of S11 (No in S11), the process of S12 is skipped. After the processes of S11 and S12, it is checked whether the back button 6 is pressed (S13). When the back button 6 is pressed in the process of S13 (Yes in S13), the previous step process (S14) is executed. Here, the previous step process will be described with reference to FIG. 9.

Figure 9:
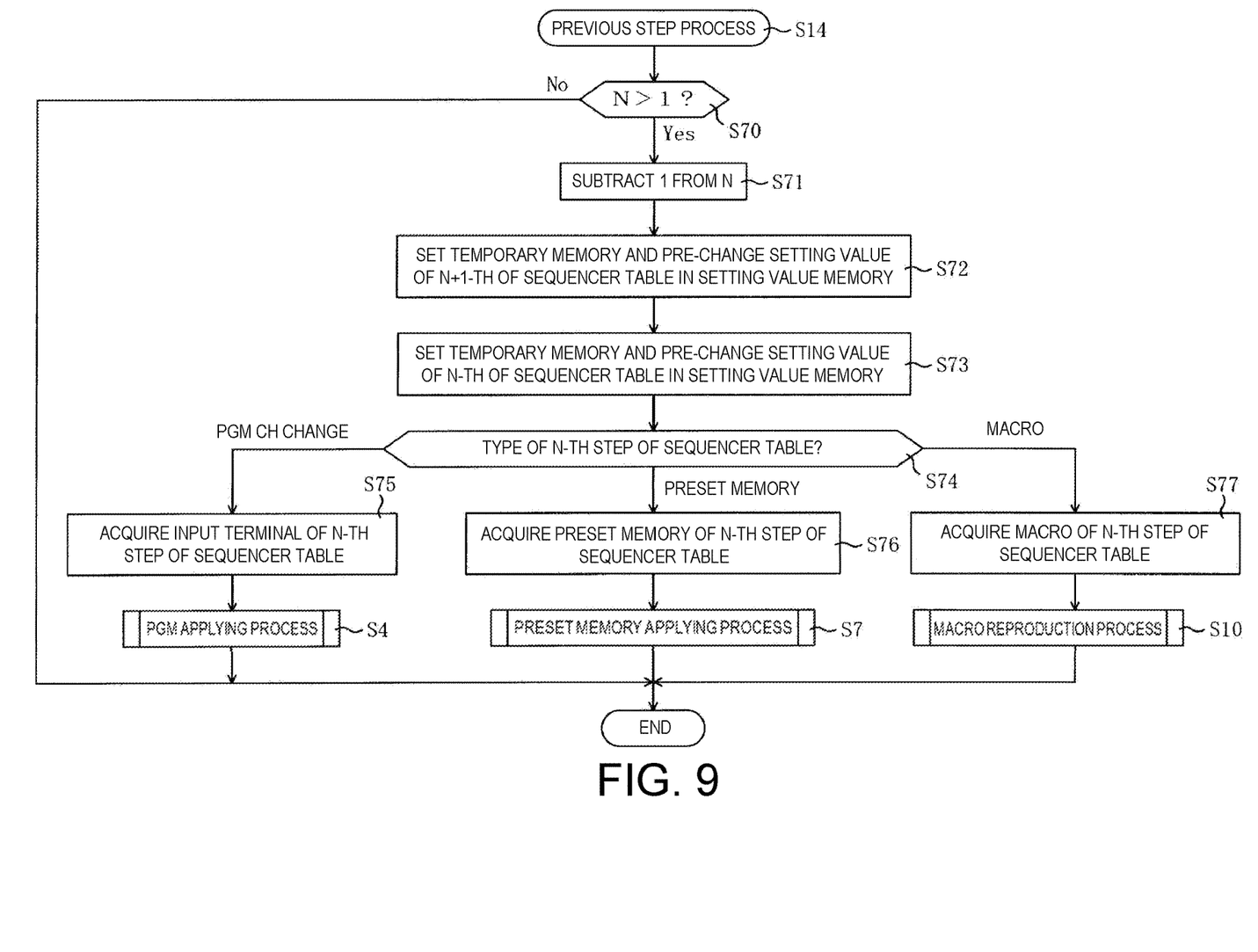
FIG. 9 is a flowchart illustrating a previous step process.

FIG. 9 is a flowchart illustrating a previous step process. In the previous step process, it is first checked whether the counter variable N is greater than 1 (S70). When the counter variable N is greater than 1 in the process of S70 (Yes in S70), 1 is subtracted from the counter variable N (S71).

After the process of S71, the restoration information of the N+1-th step of the sequencer table 11d, that is, the step executed with the next button 5 immediately before the back button 6 is pressed, that is, the temporary memory and the pre-change setting value, is acquired and set in the setting value memory 12a (S72).

Specifically, when the preset memory is set in "pre-change setting value" of the N+1-th step of the sequencer table 11d and the temporary memory is stored in the step, the preset memory set in the temporary memory is set in the setting value memory 12a. When the preset memory is set in "pre-change setting value" of the N+1-th step of the sequencer table 11d and the temporary memory is not stored in the step, the preset memory set in "pre-change setting value" of the step is acquired from the preset memory table 11b and set in the setting value memory 12a. Otherwise, the setting value set in "pre-change setting value" of the N+1-th step of the sequencer table 11d is set in the setting value memory 12a.

Through the process of S72, the setting state of the setting value memory 12a is reset to the state before the next button 5 is pressed immediately previously.

After the process of S72, the temporary memory and the pre-change setting value in the N-th step of the sequencer table 11d, that is, the step immediately before the step before the next button 5 is pressed, which is applied with the back button 6 are acquired and set in the setting value memory 12a (S73). The setting scheme in the setting value memory 12a in S73 is the same as that of S72, and thus detailed description thereof will be omitted. Through the process of S73, the state of the setting value memory 12a is reset to the state before the step executed with the next button 5 pressed immediately before the previous step.

After the process of S73, "type" of the N-th step of the sequencer table 11d is checked (S74). When "type" of the N-th step of the sequencer table 11d is "PGM CH change" in the process of S74 ("PGM CH change" in S74), the input terminal stored in "setting value" of the N-th of the sequencer table 11d is acquired (S75) and the foregoing PGM applying process of S4 is executed.

When "type" of the N-th step of the sequencer table 11d is "preset memory" in the process of S74 ("preset memory" in S74), the preset memory of the N-th step of the sequencer table 11d is acquired (S76) and the foregoing preset memory applying process of S7 is executed.

When "type" of the N-th step of the sequencer table 11d is "macro" in the process of S74 ("macro" in S74), the macro of the N-th step of the sequencer table 11d is acquired (S77) and the foregoing macro process of S10 is executed.

Through the process, the changing of the PGM CH, the application of the preset memory, or the reproduction of the macro in step executed by pressing the next button 5 immediately before the previous step can be executed again. When the counter variable N is equal to or less than 1 in the process of S70 (No in S50) or after the process of S4, S7, or S10, the previous step process ends.

FIG. 6 is referred back. When the back button 6 is not pressed in the process of S13 (No in S13) or after the process of S14, the processes of S2 and the subsequent steps are repeated.

The description has been made above based on the foregoing embodiment, but it can be easily estimated that various improvement or changes can be made.

In the foregoing embodiment, when the next button 5 is pressed, the preset memory or the like in the step immediately before the current step in the sequencer table 11d has been applied to the setting value memory 12a, but the disclosure is not limited thereto. For example, when the next button 5 is pressed, the preset memory or the like in the step two steps earlier than the current step in the sequencer table 11*d* may be applied to the setting value memory 12*a*, or the preset memory or the like in the step three or more steps earlier may be applied to the setting value memory 12*a*.

When the next button 5 is pressed, the preset memory or the like of each step from step "1" of the sequencer table 11*d* to the final step of the sequencer table 11*d* may be applied to the setting value memory 12*a* automatically in ascending order at a predetermined time interval (for example, every 3 seconds). The operation may be executed when a button or the like provided separately from the next button 5 is operated.

Similarly, when the back button 6 is pressed, the preset memory or the like in the step in a case in which the next button 5 is pressed immediately before the previous step in the sequencer table 11*d* has been applied to the setting value memory 12*a*, but the disclosure is not limited thereto. When the back button 6 is pressed, the preset memory or the like in the step in a case in which the next button 5 is pressed two steps earlier than the previous step in the sequencer table 11*d* may be applied to the setting value memory 12*a* or the preset memory or the like in the step in a case in which the next button 5 is pressed three or more steps earlier than the previous step may be applied to the setting value memory 12*a*.

When the back button 6 is pressed, the preset memory or the like in each step from the current step in the sequencer table 11*d* to step "1" in the sequencer table 11*d* may be applied to the setting value memory 12*a* automatically in descending order at a predetermined time interval (for example, every 3 seconds). The operation may be executed when a button or the like provided separately from back button 6 is operated.

Further, a button or the like for designating a step of the sequencer table 11*d* to be applied to the setting value memory 12*a* may be provided in the switcher 1 and the preset memory or the like in the step of the sequencer table 11*d* designated with the button or the like may be applied to the setting value memory 12*a*. Then, a worker can operate the button or the like so that the preset memory or the like in the step of the sequencer table 11*d* desired by the worker can be applied to the output video easily and quickly.

In the foregoing embodiment, the switcher 1 is configured to be able to execute each of the changing of the PGM CH, the application of the preset memories, and the reproduction of the macros, but the disclosure is not limited thereto. Only one of the changing of the PGM CH, the application of the preset memories, and the reproduction of the macros may be executed or two thereof may be executed.

In the sequencer table 11*d*, the PGM CH change, the preset memory, and the macro stored as "type" have been exemplified, but the disclosure is not limited thereto. For example, only one of the PGM CH change, the preset memory, and the macro may be stored or two thereof may be stored.

In the foregoing embodiment, even when the macro is reproduced in the previous step process of FIG. 9, the standby process in the case in which "standby" is set in the event of the macro is executed by executing the macro reproduction process of S10. However, the disclosure is not limited thereto. When the macro reproduction process of S10 is executed from the previous step process of FIG. 9 and "standby" is set in the event of the macro, the change in the setting related to the video processing stored in the macro may be completed instantly by omitting (skipping) the event of "standby." Then, the output device is output after the completion of the reproduction of the macro immediately after the re-execution of the previous step process. Therefore, it is possible to inhibit a discomfort of a viewer who views the output video.

In the foregoing embodiment, the restoration information (the pre-change setting value and the temporary memory) in the step of the sequencer table 11*d* executed while pressing the next button 5 is pressed immediately previously through the process after S72 of the previous step process of FIG. 9 and the restoration information of the sequencer table 11*d* in the immediately previously target step to be re-executed are applied to the setting value memory 12*a*, and then the application or the like of the preset memory in the target step to be re-examined is executed, but the disclosure is not limited thereto.

For example, instead of the process after S72 of the previous step process, the restoration information in the step executed immediately previously while pressing the next button 5 may be applied (reflected) to the setting value memory 12*a*. Then, since the state of the setting value memory 12*a* is restored to the immediately previous state of the executed step, the output video immediate after execution of the immediately previous step can be output quickly.

In the foregoing embodiment, when the N-th step is the preset memory in the subsequent step process of FIG. 8, the setting value memory 12*a* is set as the memory with the same configuration (that is, the temporary memory) as that of the preset memory or is set to the preset memory stored in the immediately applied preset memory table with regard to the restoration information. When the N-th step is the PGM CH change or the macro, the setting value of the setting related to the video processing changed due to the changing of the PGM CH or the reproduction of the macro is used as the restoration information.

However, the disclosure is not limited thereto. Even when the N-th step is the preset memory, the setting value of the setting related to the video processing changed due to the preset memory may be adopted. Even when the N-th step is the PGM CH change or the macro, the setting value memory 12*a* at that time set to the preset memory (that is, the temporary memory) may be used as the restoration information.

In the foregoing embodiment, the switcher 1 is exemplified as the device that executes the video processing program 11*a*, but the disclosure is not limited thereto. For example, the video processing program 11*a* may be executed by an information processing device such as a PC, a smartphone, or a tablet terminal.

What is claimed is:

1. A video processing device comprising:
   a state memory configured to store a plurality of setting states of each setting related to video processing;
   a state applying processor configured to apply the setting states stored in the state memory to the settings related to the video processing;
   a history memory configured to set a series of changes in the settings related to the video processing as a change history of one group and store a plurality of change histories of the one group;
   a history reproduction processor configured to reproduce the series of changes of the settings related to the video processing in the change histories by changing the settings related to the video processing based on the change histories stored in the history memory;
   an execution sequence memory configured to store a sequence of the setting states to be applied among the plurality of setting states stored in the state memory and the change histories of the one group to be reproduced among the plurality of change histories of the one group stored in the history memory; and
a sequencer configured to execute the application of the setting states by the state applying processor and the reproduction of the change histories by the history reproduction processor in the sequence stored in the execution sequence memory.

2. The video processing device according to claim 1, further comprising a retrospective execution processor configured to retrospectively re-execute the application of the setting states and the reproduction of the change histories of the one group executed by the sequencer.

3. The video processing device according to claim 2, further comprising:
a restoration information memory configured to store, as restoration information, the setting state of each setting related to the video processing immediately before the application of the setting state is executed by the sequencer and the setting value of the setting changed at least in the reproduction of the change histories of the one group executed by the sequencer,
wherein, before the retrospective re-execution by the sequencer, the retrospective execution processor reflects, in the setting of the video processing, restoration information which is restoration information stored in the restoration information memory and is restoration information stored immediately before execution of a retrospective re-execution target by the sequencer.

4. The video processing device according to claim 1, further comprising:
a restoration information memory configured to store, as restoration information, the setting state of each setting related to the video processing immediately before the application of the setting state is executed by the sequencer and the setting value of the setting changed at least in the reproduction of the change histories of the one group executed by the sequencer; and
a restoration processor configured to restore the setting of the video processing immediately before the execution by the sequencer by reflecting the restoration information stored in the restoration information memory in the settings of the video processing.

5. A video processing method comprising:
storing a plurality of setting states of each setting related to video processing;
storing a sequence of the setting states to be applied among the plurality of stored setting states;
applying the stored setting states to the settings related to the video processing; and
sequentially executing the application of the setting states to be applied in the stored sequence.

6. The video processing method according to claim 5, further comprising:
retrospectively re-executing the sequentially executed application of the setting states.

7. The video processing method according to claim 6, further comprising:
storing, as restoration information, the setting states of each setting related to the video processing immediately before the sequential execution,
wherein, in the retrospective re-execution, restoration information which is restoration information stored immediately before sequential execution of a retrospective re-execution target is reflected in the settings of the video processing before the retrospective re-execution of the sequential execution.

8. The video processing method according to claim 6, further comprising:
storing, as restoration information, a setting value which is a setting value of a setting related to the video processing immediately before the sequential execution and is a setting value of the setting changed through at least the sequential execution,
wherein, in the retrospective re-execution, restoration information which is restoration information stored immediately before sequential execution of a retrospective re-execution target is reflected in the setting of the video processing before the retrospective re-execution of the sequential execution.

9. The video processing method according to claim 5, further comprising:
storing the setting states of each setting related to the video processing immediately before the sequential execution as restoration information; and
restoring the setting of the video processing immediately before the sequential execution by reflecting the restoration information to be stored in the setting of the video processing.

10. The video processing method according to claim 5, further comprising:
setting a series of changes of the settings related to the video processing as a change history of one group;
storing a plurality of change histories of the one group; and
reproducing the series of changes of the settings related to the video processing in the change histories by changing the settings related to the video processing based on the stored change histories,
wherein, when the sequence is stored, a sequence of the setting states to be applied among the plurality of setting states that have been stored and the change histories of the one group to be reproduced among the plurality of change histories of the one group that have been stored is stored, and
wherein, in the sequential execution, the application of the setting states and the reproduction of the change histories are executed in the stored sequence.

11. A video processing method comprising:
setting a series of changes of a setting related to video processing as a change history of one group;
storing a plurality of change histories of the one group;
storing a sequence of the change histories of the one group to be reproduced among the plurality of stored change histories of the one group;
reproducing the series of changes in the setting related to the video processing in accordance with the change histories by changing the setting related to the video processing based on the stored change history; and
executing reproduction of the change histories in the stored sequence.

12. The video processing method according to claim 11, further comprising retrospectively re-executing the sequentially executed reproduction of the change histories of the one group.

13. The video processing method according to claim 12, further comprising:
storing a setting value which is a setting value of a setting related to the video processing immediately before the sequential execution and is a setting value of the setting changed through at least the sequential execution as restoration information,
wherein, in the retrospective re-execution, restoration information which is restoration information stored immediately before sequential execution of a retrospective re-execution target is reflected in the setting of the video processing before the retrospective re-execution of the sequential execution.

14. The video processing method according to claim 11, further comprising:
   storing a setting value which is a setting value of a setting related to the video processing immediately before sequential execution and is a setting value of the setting changed through at least the sequential execution as restoration information; and
   restoring the setting of the video processing immediately before the sequential execution by reflecting the restoration information to be stored in the setting of the video processing.

15. A video processing device comprising:
   a state storage part configured to store a plurality of setting states of each setting related to video processing;
   a state applying part configured to apply the setting states stored in the state storage part to the settings related to the video processing;
   a history storage part configured to set a series of changes in the settings related to the video processing as a change history of one group and store a plurality of change histories of the one group;
   a history reproduction part configured to reproduce the series of changes of the setting related to the video processing in the change histories by changing the settings related to the video processing based on the change histories stored in the history storage part;
   an execution sequence storage part configured to store a sequence of the setting states to be applied among the plurality of setting states stored in the state storage part and the change histories of the one group to be reproduced among the plurality of change histories of the one group stored in the history storage part; and
   a sequential execution part configured to execute the application of the setting states by the state applying part and the reproduction of the change histories by the history reproduction part in the sequence stored in the execution sequence storage part.

16. The video processing device according to claim 15, further comprising a retrospective execution part configured to retrospectively re-execute the application of the setting state and the reproduction of the change histories of the one group executed by the sequential execution part.

17. The video processing device according to claim 16, further comprising:
   a restoration information storage part configured to store, as restoration information, the setting state of each setting related to the video processing immediately before the application of the setting state is executed by the sequential execution part and the setting value of the setting changed at least in the reproduction of the change histories of the one group executed by the sequential execution part,
      wherein, before the retrospective re-execution by the sequential execution part, the retrospective execution part reflects, in the setting of the video processing, restoration information which is stored in the restoration information storage part and is stored immediately before execution of a retrospective re-execution target by the sequential execution part.

18. The video processing device according to claim 15, further comprising:
   a restoration information storage part configured to store, as restoration information, the setting state of each setting related to the video processing immediately before the application of the setting state is executed by the sequential execution part and the setting value of the setting changed at least in the reproduction of the change histories of the one group executed by the sequential execution part; and
   a restoration part configured to restore the setting of the video processing immediately before the execution by the sequential execution part by reflecting the restoration information stored in the restoration information storage part in the setting of the video processing.

* * * * *